Figure 4:
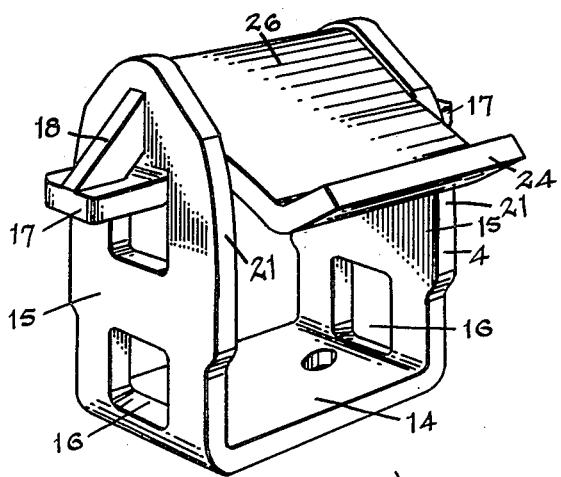

Jan. 26, 1937.  C. A. HENNEUSE  2,068,645
CRAWLER WHEEL
Filed May 29, 1934  3 Sheets-Sheet 1
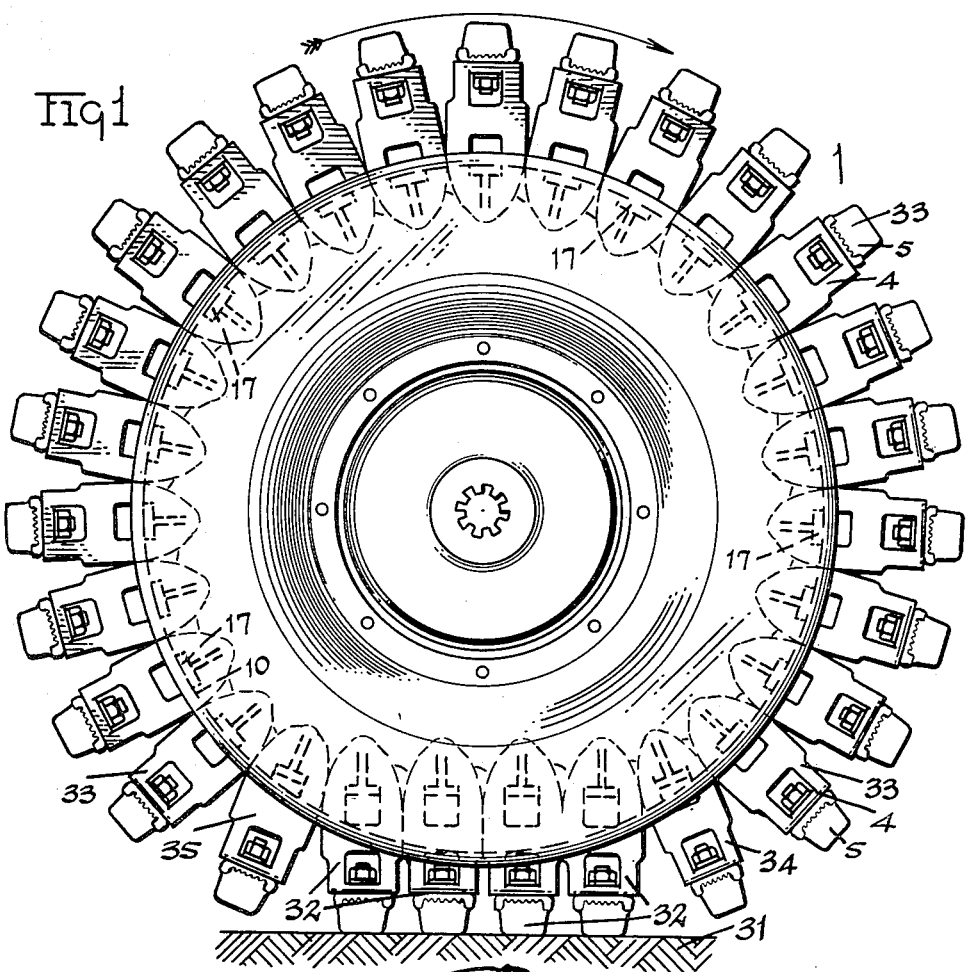
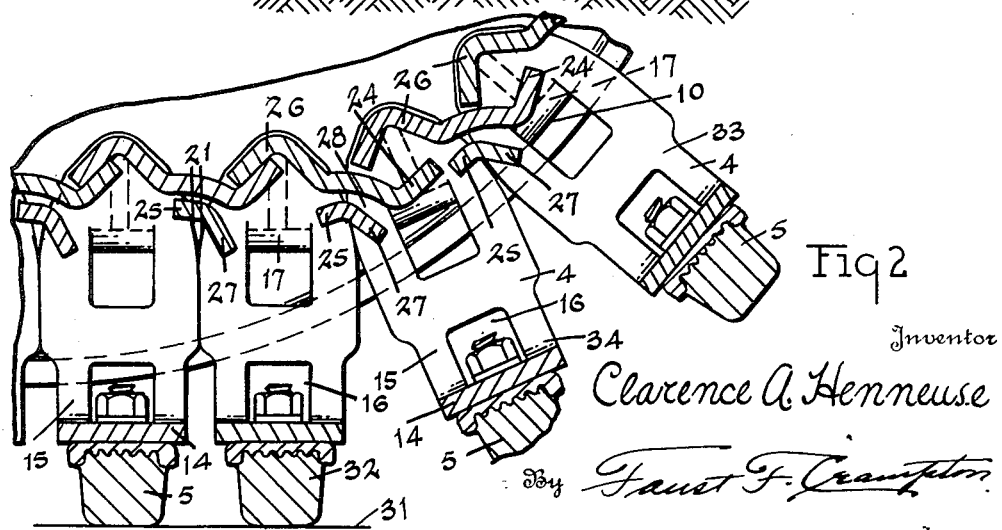
Inventor
Clarence A. Henneuse
By Faust F. Crampton
Attorney Jan. 26, 1937.  C. A. HENNEUSE  2,068,645
CRAWLER WHEEL
Filed May 29, 1934  3 Sheets-Sheet 2

Inventor
Clarence A. Henneuse
By Faust F. Crampton
Attorney

Jan. 26, 1937.  C. A. HENNEUSE  2,068,645
CRAWLER WHEEL
Filed May 29, 1934   3 Sheets-Sheet 3

Inventor
Clarence A. Henneuse
By
Attorney

Patented Jan. 26, 1937

2,068,645

UNITED STATES PATENT OFFICE 2,068,645

CRAWLER WHEEL

Clarence A. Henneuse, Bucyrus, Ohio

Application May 29, 1934, Serial No. 728,143

9 Claims. (Cl. 305—6)

My invention has for its object to provide an efficient tractor wheel having traction elements or shoes that are so constructed as to arcuately support its load on a desired number of the traction elements as they are progressively brought into contact with a supporting surface, such as a pavement or roadway.

The invention particularly has for its object to provide a tractor wheel that is, together with its load, supported by a variable number of traction members, the supporting pressures being transmitted through the traction elements to a circular traction element confining means, producing thereby a circular arrangement of those traction elements that engage the confining means. Thus, the invention provides traction elements that in themselves cooperate to maintain a desired number of traction elements or shoes in traction relation to a substantially plane roadway surface and has such flexibility of relationship by their interconnection as to insure increased traction when irregular surfaces or obstacles in the path of the tractor wheel are met. They are so interconnected with each other and with the confining means as to increase the number of traction elements that engage the supporting surface and thus increase the traction over such obstacles in proportion to the deviation of the surface of the obstacles from the normal surface. For example, when the tractor wheel meets an obstacle or an inclination to the normal surface, the traction elements change their relative positions to present the maximum traction areas according to the engageable surface of the obstacle and thus enable the wheel to more readily rise and steadily progress. Likewise, when leaving the object or an inclined surface and returning to the normal surface, the traction area is increased, which, in case of a heavy load, prevents forward slipping. The invention also affords cushioning of the wheel by reason of the change of the relations of the traction elements, the force consumed for introducing such change operating resiliently through the contacting elements to absorb any shock caused by the impinging of the tractor wheel against such objects as it progresses along its path of movement.

The invention also provides means to cause the traction elements to change from their normal positions as they are about to come into traction relationship with the surface over which the wheel is moved to positions whereby the maximum traction area of the desired or predetermined number of traction elements or shoes is presented to a plane surface, such as a pavement, or an increased number is presented to an irregular surface over which the wheel is moved.

The invention further provides traction elements so constructed as to produce substantially the minimum friction by a rolling uniform movement of the contiguous elements relative to each other as each traction element changes from the normal position to traction position and as it leaves the traction position and assumes the normal position. Thus, the traction elements are provided with curved surfaces that are developed according to the diameter of the wheel, and are formed to maintain rolling contact as between the traction elements as they change in their positions to and from the positions in which they are normally involutely carried from the following side of the traction area to the leading side of the traction area.

My invention also provides a plurality of points of engagement between the traction elements and the tractor wheel whereby there is produced an automatic increase clutch engagement as between the tractor wheel and the traction elements, which automatically produces a self-energizing clutch engagement as between the traction elements and the tractor wheel.

The invention may be applied to traction devices of different forms and traction elements having any form of traction engaging members, such as cleats or pads, or flanged parts. Likewise, the tractor wheel may be driven by any suitable source of power or it may be used as an efficient weight-carrying unit as distinct from a traction producing unit.

The invention may be contained in structures that partake of different forms, and the details of such structures may be varied without departing from the spirit of the invention. To illustrate a practical application of the invention, I have selected a structure as an example of the various constructions that may embody my invention.

The particular construction selected as an example of the structures containing my invention is illustrated in the accompanying drawings and is particularly described hereinafter.

Figure 3:
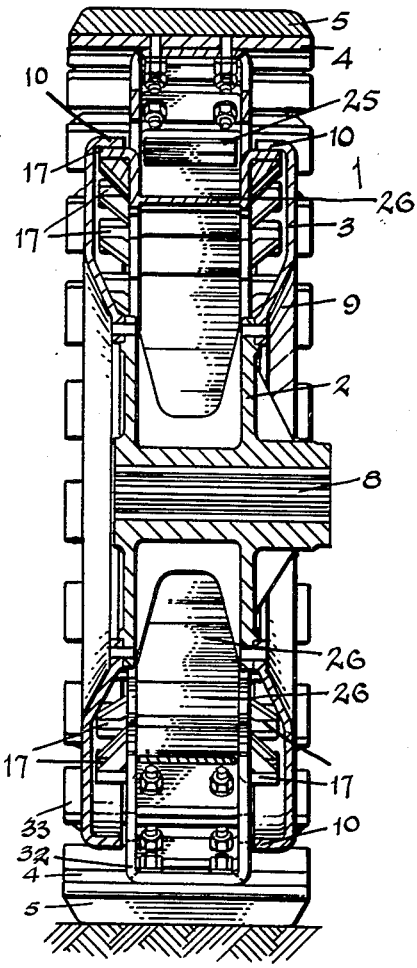
Figure 5:
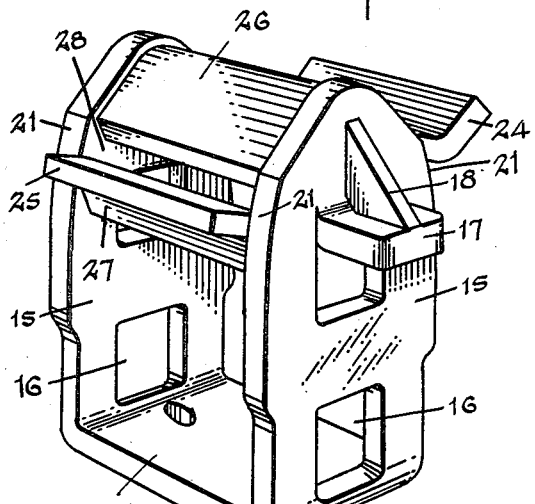

Fig. 1 is a side view of the tractor wheel selected as an example of a structure containing the invention. Fig. 2 is an enlarged view of a part of the tractor wheel illustrated in Fig. 1, showing certain of the traction elements enlarged and in section. Fig. 3 is a vertical section of the tractor wheel. Figs. 4 and 5 illustrate perspective views of one of the traction elements. Fig. 4 illustrates one side and end of the traction element, and Fig.

Figure 6:
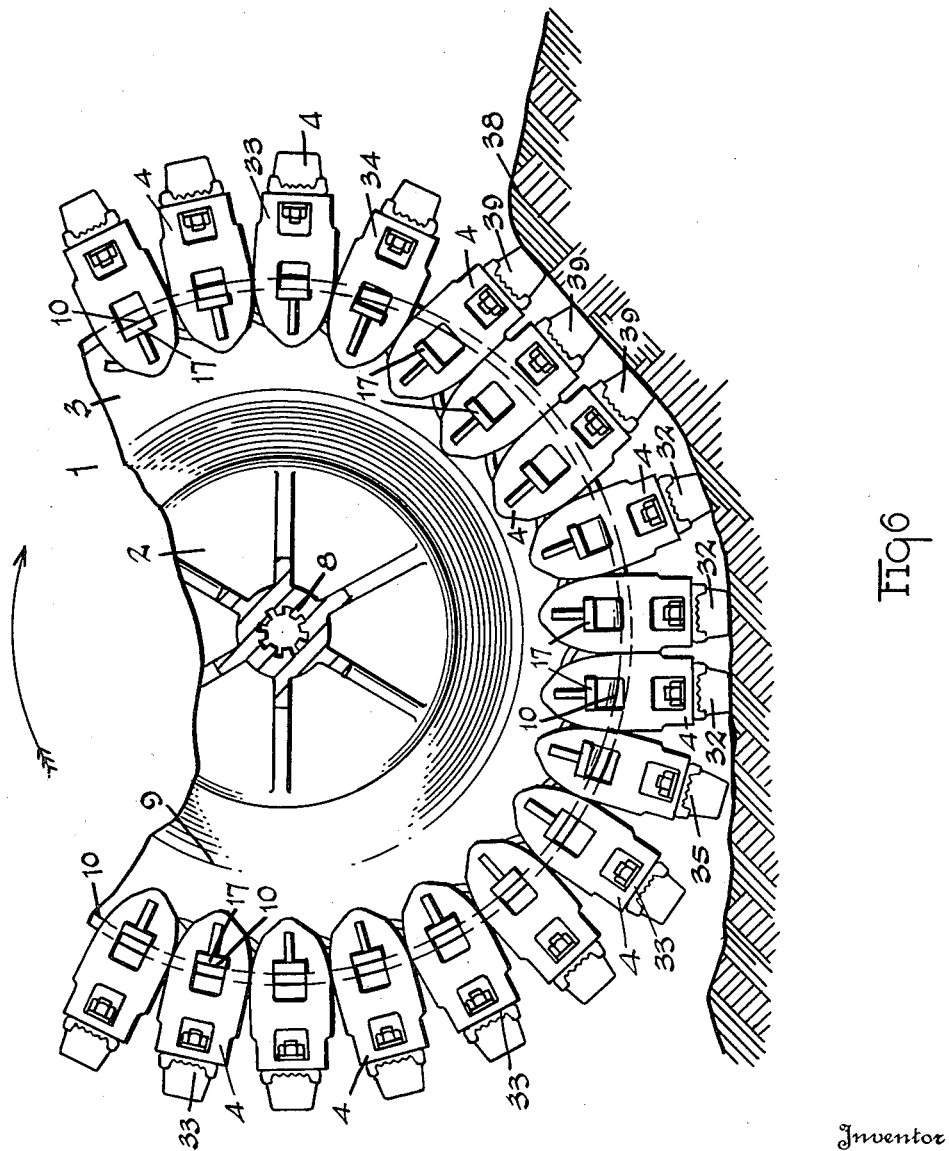

5 illustrates the other side and end of the traction element. Fig. 6 illustrates a broken and partly sectional view of the tractor wheel and shows the relative positions of the traction elements when the tractor wheel moves over an irregular surface.

The particular tractor wheel 1 illustrated in the drawings comprises a hub member 2, a pair of annuli or flanged disc members 3 and a plurality of traction members 4 having suitable tread or ribbed parts 5. The hub member is provided with means for connecting it with a suitable axle either for rotating the tractor wheel or for rotatably connecting the tractor wheel to a frame or conveyance. Where the tractor wheel is to be driven by suitable power, the hub 2 may be splined, as at 8, for connection with the driving shaft driven by a suitable engine or other source of power.

The discs 3 that form, with the hub, the body part of the tractor wheel are bolted or riveted, or otherwise connected or formed integrally with the hub 2. The discs are formed to centrally flare as at 9, and are provided with inturned flanges 10 at their peripheries to form, between the parts 9 and 10, spaces for movement of parts of the traction elements 4. The flanges 10 operate to retain the traction elements in operative relation to each other and to the body of the tractor wheel.

The traction elements are preferably formed of sheet metal, having parts formed integrally therewith or secured as by welding and shaped to co-function with each other and the flanged discs or annuli 3 of the tractor wheel. Thus, each traction element 4 has an outer-most part 14 with reference to the tractor wheel as a whole, to which may be secured pads, such as the pads 5. The pads 5 may be replaced by grids or ridged members that form engaging treads suitable to the pavement or road over which the tractor wheel may be moved to produce the maximum traction or to protect the pavement over which the wheel may be moved. Also, if desired, the traction elements may be provided with flanged members suitable for operation of the wheel on rails. The treads or pads 5 may be secured to the outer-most part 14 of the traction elements by suitable bolts, or inturned, angularly disposed flanges, or other engaging elements in the manner well known in the art.

The traction elements are also provided with end parts 15 that may be cut to form openings 16, and lugs 17 may be struck up from the metal of which the traction elements are formed. The lugs 17 may be suitably braced as by the brackets 18. The ends of the traction elements are disposed between the disc members 3 of the tractor wheel and in the space formed between the flaring central parts 9 and the flanges 10. Outward radial movements of the traction elements are thus limited by the engagement of the lugs 17 and the flanges 10, and consequently the traction elements are confined circularly by the flanges 10.

The traction elements protrude from between the discs 3 and are placed side by side, the sides having curved surfaces that enable a rolling movement of contiguous traction elements as they sequentially engage or leave the road surface over which the tractor wheel is moved. In the particular form of construction shown in the drawings, the traction elements are confined against endwise movement and in a direction transverse the wheel by the lugs 17, which engage the surfaces of the discs and the peripheral flanges 10, and the edges of the flanges engage the end parts 15 of the traction elements. The end parts 15 are provided with the curved surfaces 21 that contact with the corresponding curved surfaces of the contiguous traction elements. The number of the traction elements used in the tractor wheel being sufficient to maintain at all times rolling contact between the contiguous traction elements at points within the areas of the surfaces 21, all sliding contact between the traction elements is practically eliminated. The number of the traction elements used in connection with the wheel will vary according to the diameter of the peripheral flanges 10 of the discs 3, and also according to the dimensions of the traction elements as measured circularly with respect to the wheel.

Inasmuch as the traction elements have a limited floating movement within the confines of the peripheral flanges 10, means for engaging contiguous traction elements is preferably provided to produce a more limited floating movement between the contiguous traction elements and to cause succeeding traction elements to position themselves consecutively as they are sequentially forced into or away from their normal positions either when performing the tractional function of the wheel or when the wheel is used to support the load that is otherwise drawn. Thus, the traction elements 4 are provided with the laterally extending flanges 24 and 25 for interconnecting the contiguous elements.

The flange 24, in the form of construction shown, protrudes from one side of each traction element 4, while the flange 25 protrudes from the opposite side. They may be welded between the end parts 15, substantially as shown. A part 26 of the flange 24 extends across the end parts 15 in engaging relation with the flange 24 of a contiguous element. The inner-most end edges of the end parts 15 of the traction elements are formed wedge-shape, and the part 26 is bent to conform to this shape. The flanged part 24 is bent to form substantially a V-shape, and consequently the metal from which the flange 24 is formed conforms substantially to a sinuous or reverse curved shape. The flange 25 is so disposed with respect to the end of the part 26 as to form a slot 28 into which the flange 24 of the contiguous traction elements may be inserted and be located within the inner surface of the part 26 with respect to the traction element. The ends 27 of the flanges 24 are inclined towards the outer end of the element and allow angular movement of the flange 24 of the contiguous element.

When the traction elements are assembled, the flanges 24 of the traction elements are inserted in the slot 28. This enables ready assembly of the traction elements in the wheel, and, by reason of the relationships of the surfaces of the flanges 24 and 25 and the inner surfaces of the parts 26, they co-ordinate in supporting the axle and the vehicle or other load connected to the hub of the wheel through the axle.

The number of traction elements used and the dimensional relations between the tractional elements and the inner diameters of the peripheral flanges 10 of the discs 3 must necessarily be such as to enable limited radial movement of such traction elements as are desired shall be available for the transmission tractionally of the power that produces forward movement of the tractor wheel, or for sustaining the load where the tractor wheel is used as a follower or as merely a load carrying wheel. The number that is progressively utilized for traction purposes and load carrying purposes will be dependent upon the character of the roads or ground on which the wheel is to be more commonly used for traction and load carrying purposes, a suitable number of traction elements being used to produce a substantially constant and desired tractional and load supporting area of the traction wheel and to cover the desired ground area for tractional and load-carrying purposes. As the traction elements progressively contact with the road, the load crowds or forces the traction elements against each other, the pressure being transmitted through the curved surfaces 21 on which the contiguous traction elements roll as the traction elements progressively move into positions for engagement with the road as the tractor wheel moves over the road. This pressure causes the lugs 17 of the traction elements in contact with the road to move from the flanges 10 of the wheel as the traction elements engage the road, and, at the same time, the pressure transmitted through the contacting areas of the surfaces 21 sustains the traction elements removed from the surfaces of the road. The traction elements thus sustained are pressed radially, the lugs 17 being pressed against the flanges 10. They coact to locate the traction elements in radially protruding positions and operate to support the load.

The traction elements, by reason of the wedge-shaped parts defined by the curved surfaces 21, are normally maintained so as to protrude radially and at right angles to lines interconnecting contacting points on the curved surfaces. The curved surfaces 21 of each traction element approach parallel plane surfaces near their ends and are operative to force, with a uniform change in angular movement, each succeeding traction element from the said radial position to a position at right angles to the supporting surface on which the wheel is located or which the wheel may engage as it is moved and as each traction element approaches the surface. The same movement also occurs as the traction element returns to its radial position as it leaves the supporting surface.

As shown in Fig. 1, the traction elements 4 have dimensional relations to the peripheral flanges 10 of the wheel as to enable four of the traction elements 4, such as the traction elements 32, to function tractionally and to support the load on a plane surface 31, which number, however, will automatically vary according to irregularities in the road surface form and variation in rigidity of the surface. As the traction elements make contact with the surface 31 of the road-way, they assume substantially vertical positions or dispose themselves substantially at right angles to the roadway 31, owing to the counterpressure produced by the load and by reason of the substantially plane surfaces of the lower parts of the curved surfaces 21. The crowding of the traction elements produced by the inward movement of the traction elements, as they come in contact with the road forces the traction elements 33 that are being carried involutely into radial positions by reason of the sloping curved or wedge-shaped surfaces 21 of the inner end-portions of the traction elements as well as by reason of the width of the lugs 17 that engage the flanges 10. The traction elements thus take positions at right angles to a line extending across each traction element and from the point of contact of the contiguous traction element on one side to the point of contact of the contiguous element on the other side, and, as the traction elements approach the road on the forward side of the supporting area, the traction elements, such as the traction elements 34, are swung towards the roadway by reason of the change of the position of the contacting point with the contiguous traction element 32 that has precedingly been engaged by the road surface, as shown in the figure. Consequently, the traction element 34 as it is carried down towards the roadway is rolled along the greater part of the surface 21 of the contiguous traction element so as to locate the traction element 34 eventually in an upright position relative to the road-way 31 and into the same relative positions to the road-way that the traction elements 32 are located. At the same time and likewise, the traction element 32 on the following side of the supporting area of the roadway is swung away from its contiguous traction elements, 32, as indicated at 35, and eventually into the radial position. The changes in position of the traction elements as they take the positions generally indicated at 35 is due to a change in relative positions of their contacting points with those that are in actual engagement with the road-way and those that are disposed radially with respect to the center of the wheel. Thus, the traction elements disposed on the surface of the road have contacting points located in a chord of the circle conforming to the flanges 10, and the summation of the lines between the contacting points of all of the contiguous traction elements of the wheel is substantially equal to the sum of the length of the chord and the portion of the circle supplemental to that subtended by the chord. If, then, any other of the traction elements are engaged by the road-way, due either to depressions in the surface of the road-way or obstacles or inclinations in the surface over which the tractor wheel is moved, or due to softness of the road-way surface, the additional traction elements that engage the surface will in like manner be moved inwardly with respect to the flanges 10 because of the fact that they assume their share of the pressure and burden of the load.

When the tractor wheel meets an obstacle or an inclination in the road surface, an increased number of elements engage the road-way and position themselves to produce the maximum traction as shown in Fig. 6, wherein the tractor wheel is assumed to be moving to the right and meets with the rise in the road-way or an obstacle, as indicated at 36. Under these circumstances, the traction elements whose lugs are removed from the flanges 10 lie on a changing line extending chord-like to the circle of the flanges 10. The line is a broken line that is located wholly within the circle and extends from one point of the circle to another point of the circle, but the summation of the lengths of the lines between the contacting points of the traction elements is at all times slightly less than the length of the circle and is at all times substantially equal to the sum of the chord of predetermined length and that portion of the circle that is supplemental to the part of the circle that is subtended by the chord. This is due to the face that by reason of the extension of the number of the traction elements that support the load, when the wheel is supported on an irregular surface, the distance between the lugs 17 of the traction elements that are thus forced away from the flanges 10, is, in every case, as shown in Fig. 6, less than the maximum distance that the lugs 17 of the traction elements 32 are forced from the flanges 10 when the wheel is located on a substantially rigid surface. Thus, when the tractor elements meet an obstacle, such as the rise in the roadway indicated at 38, the traction elements 32 change their position as they meet the rise and as they progress; additional traction elements, such as the traction elements 39, take the positions that the crowding and wedging of their contiguous and associated traction elements force them into, which is determined by the relative direction of the lines between the contacting areas of the surfaces 21.

Thus, when the traction elements meet an obstacle in the roadway, there is an increased traction area that is engaged, and an increased number of traction elements that cooperate to move the tractor wheel forward, some of which operate in the rotation on the tractor wheel to lift the tractor wheel over obstacles by the impact with the obstacles and thus cooperate more effectively to maintain the forward movement of the tractor wheel. Furthermore, by reason of the flexibility and frictional resistance to change in the positions of the traction elements relative to each other and to the flanges, there is produced a shock-absorbing result which is yielding in character and reduces the effect of a sudden change in direction of movement and rate of movement of the tractor wheel. Also, where the tractor wheel is driven by a source of power, the power is transmitted to the discs having the peripheral flanges 10 against which the lugs 17 are pressed quite in proportion to the load that is carried by the traction element and quite in proportion to the power that is transmitted to the lugs, so that there is produced a clutch operation by the traction elements and the driving peripheral flanges 10 automatically increase the clutch engagement between the driving means and the traction elements to produce a self-energizing clutch engagement that eliminates slippage or lost motion as between the axle and the traction elements.

I claim:

1. In a vehicle supporting part, a plurality of traction elements, each traction element having curved bearing surfaces on opposite sides thereof and in contact with and rollable along the curved surfaces of the contiguous elements, the supporting part having a curved confining means that engages the elements for supporting the vehicle supporting part by transmission of pressure from the elements that engage the supporting surface over which the vehicle is adapted to move to the said means through the curved bearing surfaces, the curved bearing surfaces progressively tilting consecutive elements from positions of engagement with the confining means as the supporting surface is engaged by the traction elements and the vehicle moves relative to the supporting surface.

2. In a tractor wheel, a plurality of contiguous traction elements having relatively sloping, convex curved, contacting surfaces, means for confining the traction elements within a circle about the axis of the wheel, the distances between the contacting points on the said surfaces being such that a limited number of traction elements are pressed inward when they engage the supporting surface over which the wheel moves and the other of the traction elements are pressed against the confining means, the said contacting surfaces being operative to progressively tilt consecutive traction elements as they are moved to and from the confining means and from and to the wheel supporting surface as the traction elements respectively leave and approach the supporting surface of the wheel in the movement of the wheel relative to the supporting surface.

3. In a tractor wheel adapted to roll on a supporting surface and having a plurality of traction elements, each traction element having relative sloping, convex curved, lateral surfaces in contact with the curved surfaces of the contiguous elements, means for confining the traction elements within a circle for supporting the wheel on a supporting surface, certain of the said elements extending radially with respect to the wheel and other of the elements positioned perpendicular to the supporting surface, the curved surfaces operating to sequentially tilt the traction elements from the radial position to the said perpendicular position as they approach the supporting surface and from the said perpendicular position to their radial position as they leave the supporting surface.

4. In a tractor wheel adapted to roll along a supporting surface, a plurality of contiguous traction elements, each element having relatively sloping convex curved surfaces located on opposite sides thereof that contact with the curved surfaces of the contiguous elements, means for confining the traction elements within a circle about the axis of the wheel, the central major axis of each traction element located intermediate and equi-distant from the corresponding parts of the curved surfaces, certain of the elements each having the said major axis disposed radially and certain other of the traction elements each having the said major axis disposed perpendicularly to the supporting surface and the traction elements located intermediate the said certain traction elements disposed such that their said axes are inclined to the radial and to the said perpendicular positions.

5. In a tractor wheel adapted to roll on a supporting surface and having a plurality of traction elements, each traction element having sloping, convex curved, lateral surfaces in contact with the curved surfaces of the contiguous elements, means for confining the traction elements within a circle for supporting the wheel on the supporting surface, certain of the said elements extending radially with respect to the wheel and the other of the elements positioned perpendicular to the supporting surface, the curved surfaces operating to sequentially tilt the traction elements from the said radial position to the said perpendicular position as they approach the supporting surface and from the said perpendicular position to their radial position as they leave the supporting surface, the summation of the distances between the contacting points of the curved surfaces of the tilted traction elements and the said perpendicularly positioned traction elements being substantially constant to substantially prevent creeping of the traction elements relative to the wheel.

6. In a tractor wheel adapted to roll on a supporting surface, a plurality of traction elements having curved contacting surfaces, means for confining the traction elements within a circle so that certain of the elements are positioned radially of the wheel while certain of the other of the elements are positioned in contact with the said supporting surface so that they extend perpendicularly to the said supporting surface, the summation of the distances between the contact points of said curved surfaces being less than the length of the said circle and maintained substantially constant as the wheel moves over the said surface, the said contacting surfaces being operative to tilt the traction elements from the said radial position to the position in contact with said supporting surface and from the latter position to the radial position as the wheel rolls along the supporting surface.

7. In a tractor wheel adapted to roll on a supporting surface, a plurality of traction elements having sloping, convex curved, contacting surfaces, means for confining the traction elements within a circle so that the majority of the elements are positioned radially of the wheel and out of contact with said supporting surface while certain other of the elements are positioned in contact with said surface so that they extend perpendicularly to the said surface, the summation of the distances between the contacting points of said curved surfaces being slightly less than the length of said circle, the said curved contacting surfaces being operative to cause the elements positioned radially of the wheel to be wedged against the confining means so that the wheel is supported on the traction elements in a suspended condition, said curved contacting surfaces being further operative to tilt the traction elements from the radial position to the position in contact with said supporting surface and from the latter position to the radial position as the wheel rolls.

8. In a tractor wheel adapted to move over a supporting surface, the wheel having a pair of co-axially disposed circular flanges, a plurality of traction elements protruding outwardly from the said flanges and having lugs for engaging the said flanges for limiting their outward movement, each element having curved bearing surfaces rollable along the curved surfaces of the contiguous elements, certain of the said elements extending radially with respect to the wheel and other of the elements extending perpendicularly with respect to the supporting surface, the bearing surface being operative to sequentially tilt the traction elements from the said radial position to the said perpendicular position and from the said perpendicular position to the said radial position as the wheel moves relative to the supporting surface.

9. In a tractor wheel adapted to move over a supporting surface, the wheel having a pair of co-axially disposed circular flanges, a plurality of traction elements protruding outwardly from the said flanges and having lugs for engaging the said flanges for limiting their outward movements, each element having curved bearing surfaces rollable along the curved surfaces of the contiguous elements, certain of the said elements extending perpendicularly with respect to the supporting surface, each element having a projecting finger and a part for engaging the finger of a contiguous element for limiting the relative movements of the contiguous traction elements, the curved surfaces being operative to press other of the elements radially and to sequentially tilt the radially disposed traction elements from the said radial positions to the said perpendicular positions and from the perpendicular positions to the said radial positions as the wheel moves relative to the supporting surface.

CLARENCE A. HENNEUSE.